Oct. 6, 1936.  G. W. DOPP  2,056,506
LEADER
Filed Aug. 21, 1934
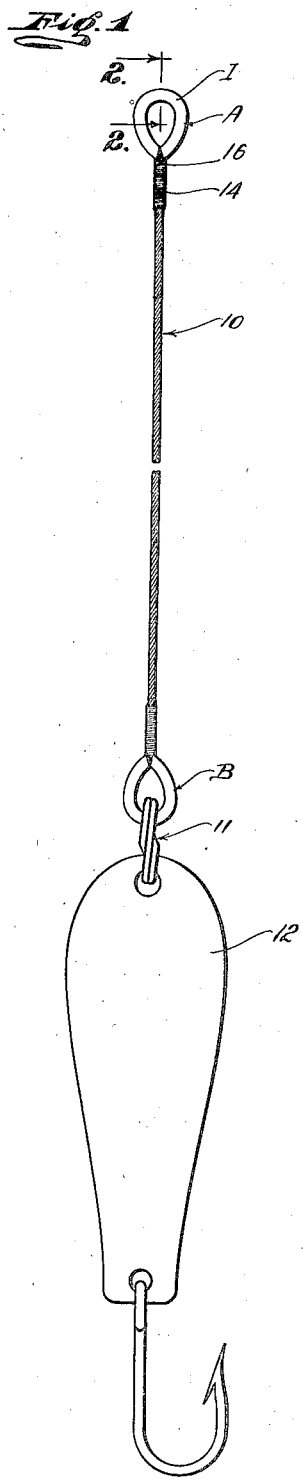
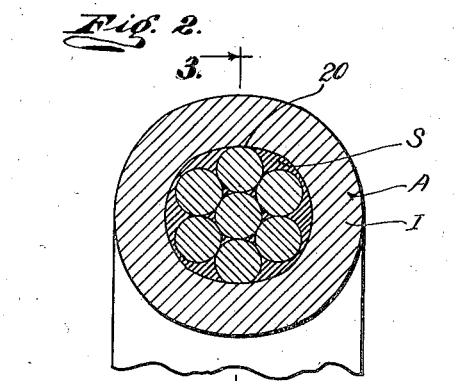
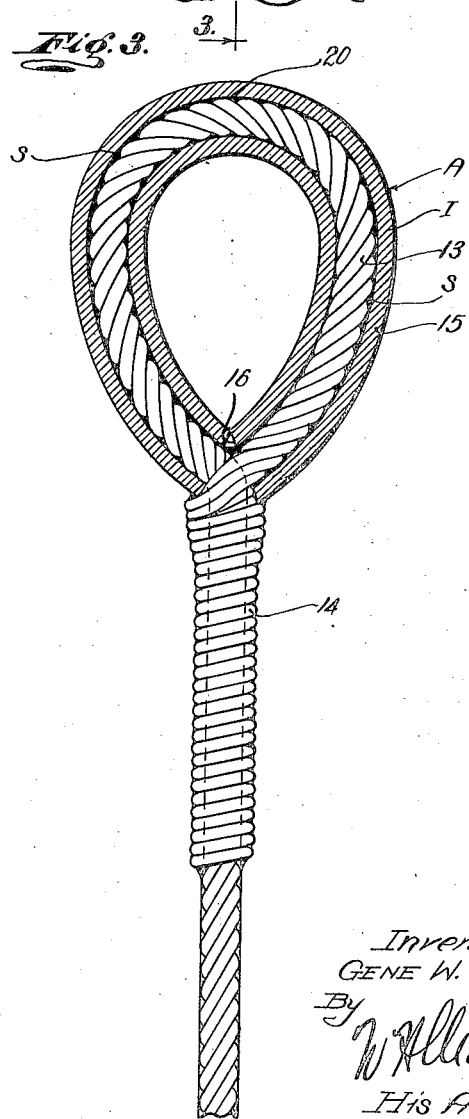
Inventor
GENE W. DOPP
By
W. H. Maxwell
His Attorney Patented Oct. 6, 1936

2,056,506

UNITED STATES PATENT OFFICE 2,056,506

LEADER

Gene W. Dopp, Los Angeles, Calif.

Application August 21, 1934, Serial No. 740,793

1 Claim. (Cl. 43—28)

This invention relates to fishing tackle and relates more particularly to a snood or leader for a fishing line. A general object of this invention is to provide a practical, effective leader that is particularly strong and durable.

Another object of the invention is to provide a leader embodying an improved loop structure or eye for receiving the ring of a swivel, hook, gig, or the like, which is capable of withstanding hard usage and heavy strains without breaking or failing.

Another object of the invention is to provide a leader including loops or eyes each comprising a loop in the wire body of the leader and a sealed tube encasing the looped wire to protect it against the action of water and contact by the ring of the swivel, hook, gig, sinker or the like.

Another object of the invention is to provide a leader of the character mentioned in which the tubes enclosing the looped portions of the leader wire are filled with solder or the like, so that the wire and the tubes are intimately joined and bonded together to form solid rigid eye structures that are strong and fluid tight.

A further object of the invention is to provide a leader of the character mentioned that is simple and inexpensive of manufacture.

The various objects and features of the invention will be fully understood from the following detailed description of a typical preferred form and application of the invention, throughout which description reference may be had to the accompanying drawing, in which:

Fig. 1 is an elevation view of a typical leader of the present invention carrying a gig. Fig. 2 is an enlarged, transverse detailed sectional view of one of the eyes of the leader being a view taken as indicated by line 2—2 on Fig. 1 and Fig. 3 is a longitudinal detailed sectional view of the eye taken as indicated by line 3—3 on Fig. 2 illustrating the leader body, its looped portion and its wrapped portion in elevation.

The present invention may be embodied in leaders for use in connection with fishing tackle of various characters. Throughout the following detailed disclosure I will describe a typical simple embodiment of the invention useful for carrying hooks, gigs, sinkers, etc., it being understood that the invention is not to be construed as limited or restricted to the specific details about to be set forth.

The fishing leader of my invention includes, generally, a body 10 consisting of a length of wire and loop structures or eyes A and B on the opposite ends of the body 10.

The body 10 of the leader is preferably formed of stranded steel wire of a good quality, it being understood, however, that the body 10 may be formed of unstranded wire if desired or found practical. When the body 10 is formed of stranded wire it is not easily kinked or permanently bent and stranded wire is particularly suited to the construction of the eyes A and B as will become apparent from the following description of the eyes. The gauge, length and tensile strength of the wire of the body 10 depends upon the intended use or application of the leader, it being preferred to employ suitably flexible wire having a relatively high tensile strength.

The eyes A and B are provided at the opposite ends of the leader body 10 to facilitate the connection of the leader with the fishing line and the connection of the hook, gig or other device with the leader. In the drawing the eye A is at the upper end of the leader body 10 and is adapted to receive the ring of a swivel or other device for connecting the leader with the line. The eye B at the lower end of the leader is illustrated as receiving the link or ring 11 of a typical gig 12. As the loop structures or eyes A and B may be identical I will proceed with a detailed description of the eye A, it being understood that such description also applies to the eye B.

The loop structure or eye A includes a loop 13 in the end portion of the wire body 10. The end portion of the wire body 10 is curved and bent back upon itself to form the loop 13, the end of the looped portion being connected or joined with the body 10 to maintain the loop. In the preferred construction the end of the looped portion is tightly wrapped about the body 10 for a suitable distance along the body as shown at 14. The wrappings or wrapped portion 14 securely and dependably joins the end of the looped portion with the body 10 of the leader. I prefer to untwist the end portion of the stranded wire before wrapping it on the body 10 to provide smoother and more uniform wrappings 14.

It is a feature of the invention that the eye A includes a thimble or sheath enclosing the loop 13. The sheath is in the nature of a single continuous and imperforate tube 15 passing or receiving the loop 13. The tube 15 encloses or encases the entire loop 13 and is bent into the form of a symmetrical loop or eye. The tube 15 may be formed of copper or other suitable material. The opposite ends 16 of the tube 15 may abut or engage one another and may be pitched or inclined in the manner illustrated in Fig. 3 of the drawing. The adjacent ends of the tube 15 occur where the loop 13 joins the body 10 and the major axis of the looped or bent tube 15 is preferably in approximate alignment with the longitudinal axis of the body 10.

In accordance with the invention the loop 13 is sweated in the tube 15 with solder S or the like and ends 16 of the tube 15 are closed or sealed with solder. The spaces or interstices in the tube 15 occurring between or about the strands of the loop 13 are thus filled with solder S. The solder S filling the spaces in the tube 15 provides an intimately bonded or joined assembly that is substantially rigid. The solder S at the ends 16 of the tube 15 is preferably flush with the external surfaces of the tube and continues on or over the wrappings 14 to encase the wrappings and prevent them from spreading and unwrapping.

In forming the loop structure or eye A the tube 15 is first cut to the proper length and its ends 16 are suitably bevelled. A portion of the length of the wire of which the leader is to be formed is coated with solder and the tube 15 is passed or slipped on the end of the wire to a position where it covers the soldered portion. With the tube in this position a portion of the wire extends beyond the outer end of the tube. The tube 15 may be suitably heated to melt or sweat the solder within it and the tube is bent to the desired shape to form the eye and bring the exposed end portion of the wire into position for wrapping on the body 10. The exposed end portion of the wire is then wrapped on the body as at 14 and is suitably coated with solder and the ends of the tube 15 may be sealed with solder. During the bending of the tube 15 in the formation of the eye its central or intermediate portion at the outer end of the eye is slightly distorted or flattened as at 20. The flattening of the intermediate portion of the tube 15 causes the wire of the loop 13 within the said portion to be distorted to some extent and tightly gripped in the tube. This distorting and gripping of the wire in addition to the bonding and securing action of the solder S effectively holds the tube 15 against movement with respect to the wire of the loop 13 and body 10. After the formation of the two eyes A and B as just described the entire leader may be plated with nickel or the like.

The leader provided by this invention is particularly effective because of the improved loop structures or eyes A and B. The wire of the loops 13 is fully protected against wear and corrosion. The solder sealing the ends of the tubes 15 and filling the spaces within the tubes positively excludes water from the tubes. The tubes 15 of the eyes materially strengthen the eye structures. The eyes A and B are solid and substantially rigid so that they do not readily bend or become distorted. The substantially rigid eyes A and B are properly centered or aligned with the body 10 and do not cause the leader body to become bent or kinked when the leader is in use. The eyes A and B in being substantially rigid do not become flattened or otherwise distorted and therefore insure the free movement of the rings which they receive. The improved eyes A and B involving the tubes 15 and the soldering S are much stronger and more durable than the usual or common eyes of leaders which in most instances consist of simple loops in the wires of the leaders.

Having described only a typical preferred form and application of my invention, I do not wish to be limited or restricted to the specific form and application herein set forth, but wish to reserve to myself any modifications or variations that may appear to those skilled in the art or fall within the scope of the following claim:

Having described my invention, I claim:

A leader including a body of twisted stranded wire, the body having a portion looped back upon itself to form a loop, a tube encasing the loop, and an untwisted end part of said portion being wrapped on the body to maintain the loop.

GENE W. DOPP.